June 30, 1970 — R. FERGUSON — 3,517,959

WHEEL LIFTER

Filed June 21, 1968 — 2 Sheets-Sheet 1

INVENTOR.
RONALD FERGUSON
BY Wells & St. John
 attys

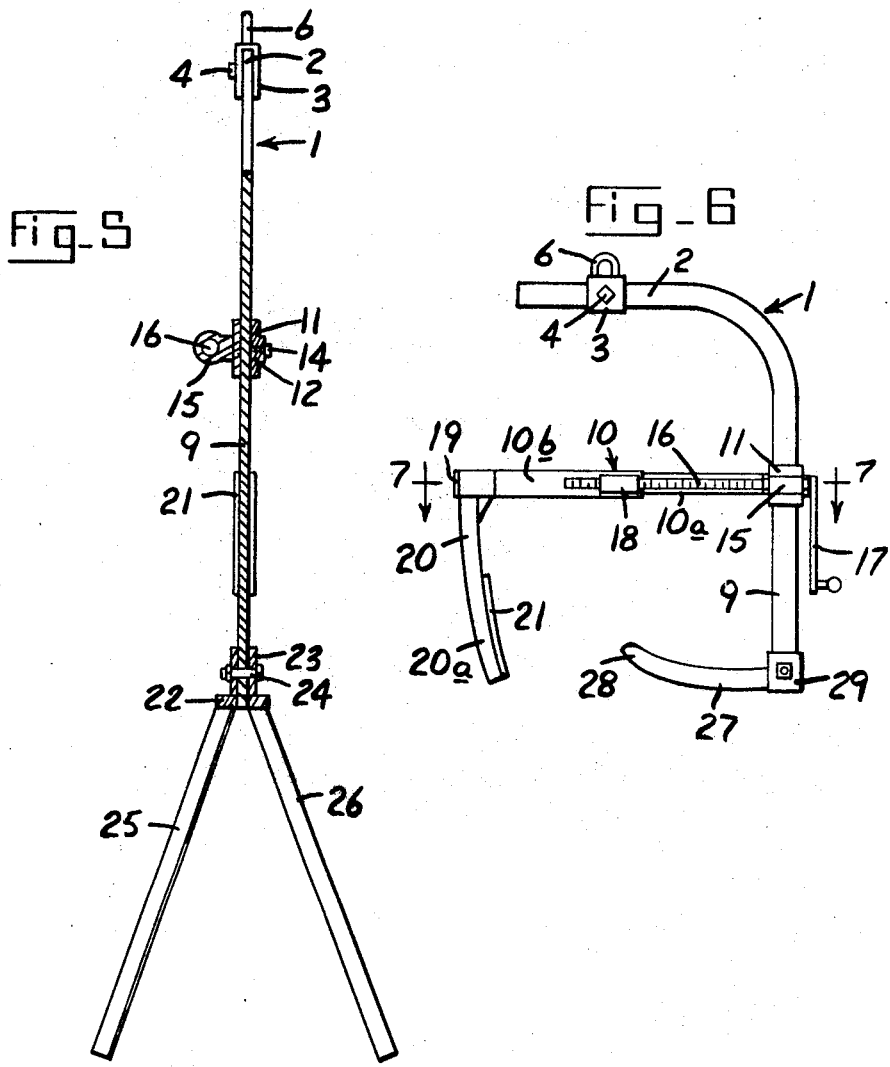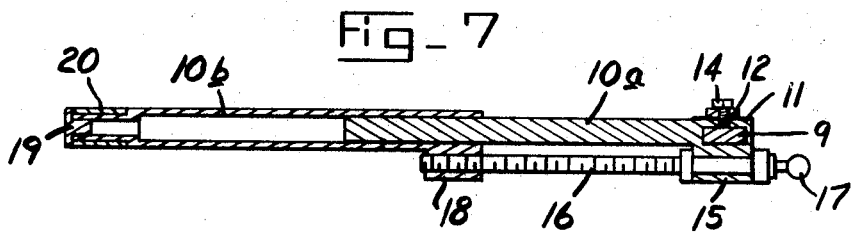

3,517,959
WHEEL LIFTER
Ronald Ferguson, Rte. 2, Box 87,
Dayton, Wash. 99328
Filed June 21, 1968, Ser. No. 739,003
Int. Cl. B66c 1/00
U.S. Cl. 294—67  6 Claims

ABSTRACT OF THE DISCLOSURE

A device to engage and support a heavy wheel of the type embodying a rubber tire and a rim inside it and has an L-shaped bar with a top horizontally extending portion with a sleeve thereon provided with an eye for attachment to the lift hook of a hoist. The bar has an integral depending portion on which an upper horizontal extensible arm is secured. This arm has a finger rotatable about its free end so it can be passed over the wheel and let fall behind the wheel on the vehicle, then drawn toward the depending portion of the L-shaped bar. At the lower end of the depending portion there is a horizontally extending support extending in the same direction as the arm to reach into the space within the tire rim. The support has two downwardly diverging fingers that serve to engage the lower part of the tire and keep the wheel upright.

THE PRIOR ART KNOWN TO THE INVENTOR

Several devices illustrated in the following U.S. patents are for the same general purpose: Johnson et al., No. 2,380,313; Lloyd, No. 2,792,139; and Curley, No. 2,640,604.

GENERAL DESCRIPTION

The present invention concerns a simple wheel lifting tool that is used with any hoist to engage and hold a heavy wheel such as the wheel of a tractor, so the wheel can be taken from the vehicle or put on the vehicle. These tractor wheels are often filled with a liquid to provide the necessary weight to enable the tractor to pull a load without slipping. It is the purpose of this invention to provide a lifter which can be carried by a man and applied to the wheel and then lifted or lowered by a hoist. It is made so it can be applied to a wheel on the tractor even though the tractor has a fender over the tire.

A preferred embodiment of the invention is shown in the accompanying drawings wherein:

FIG. 5 is an enlarged sectional view taken on the line 5—5 of FIG. 2 but with the wheel left out;

FIG. 6 is a side view of a modified form of the structure; and

FIG. 7 is an enlarged sectional view taken on the line 7—7 of FIG. 6.

Figure 1:
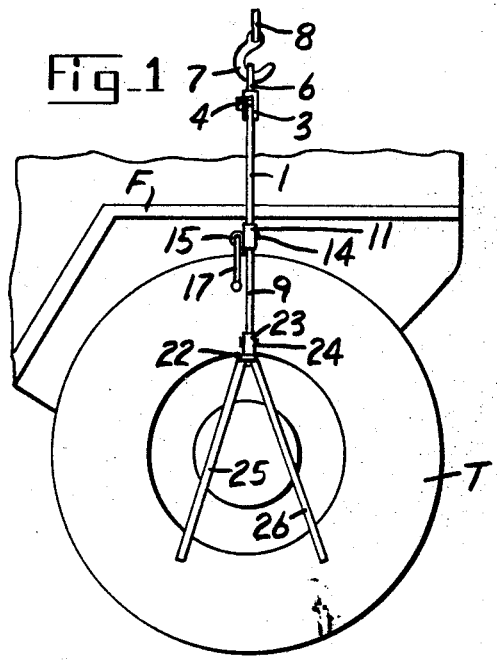
FIG. 1 is a side view of a tractor wheel showing my wheel lifter applied thereto, a portion of the tractor frame and fender being shown.
Figure 2:
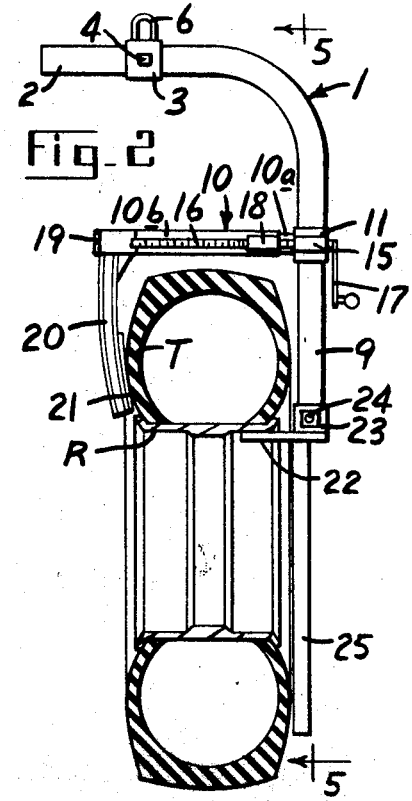
FIG. 2 is a vertical section through a removed wheel showing how the lifter engages the wheel.
Figure 3:
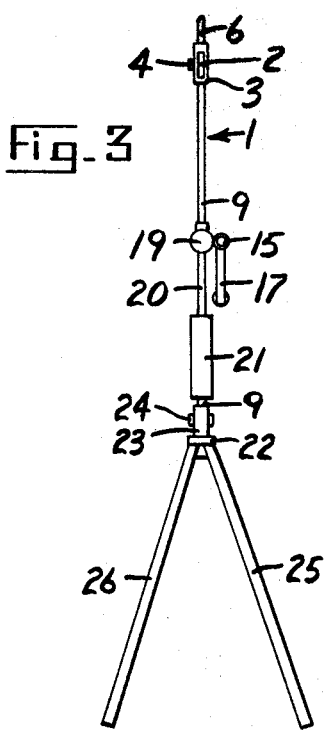
FIG. 3 is an enlarged side view of the lifter apart from a wheel.
Figure 4:
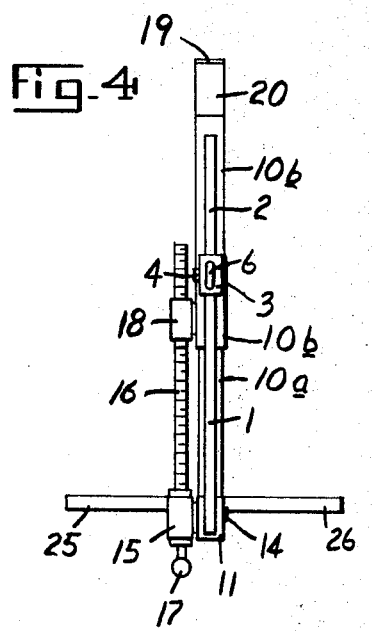
FIG. 4 is a plan view of the lifter.

Referring now in detail to the drawings the wheel lifter has a generally L-shaped bar 1 as the major component. This bar has a horizontal top portion 2 on which a sleeve 3 is secured. The bar portion 2 fits singly in the sleeve 3. A set screw 4 keeps the sleeve 3 from sliding endwise. The sleeve has a hoist attaching means 6 on it to receive a hook 7 of the hoist chain 8. The bar 1 has a depending portion 9 at substantially right angles to the portion 2. The portion 9 carries all of the wheel engaging parts.

One of the wheel engaging parts is a horizontally extending arm 10 which is vertically adjustable on the portion 9. A sleeve 11 on the end of the arm 10 receives the portion 9. The sleeve 11 has a threaded aperture 12 therein to receive a set screw 14 to determine the level on portion 9 at which the arm 10 will be held. The arm 10 is made up of two telescoping pieces 10a and 10b (see FIG. 7). The piece 10a is integral with the sleeve 11 and the sleeve 11 has an ear 15 in which an adjusting screw 16 is journalled. A hand crank 17 is used to turn the screw 16. The piece 10b of the sleeve has a threaded ear 18 thereon to receive the screw 16 so that by turning the hand crank 17 the arm 10 can be lengthened or shortened.

The free end of the arm 10 has a tire engaging finger 20 pivoted thereon and held in place by an end plug 19 in the piece 10b of the arm 10. The finger 20 has its tip portion 20a curved toward the depending portion 9 and this tip portion is provided with a widened tire engaging plate 21. This construction enables the user to draw the finger 20 against a tire T to hold the tire on a support 22 at the lower end of the portion 9.

The support 22 is affixed to the lower end of the portion 9 by a sleeve 23 on the support that receives the portion 9 and a pin 24 that goes through both the sleeve and the portion 9. This is a point where the weight of the wheel is carried so the support 22, sleeve 23 and pin 24 have to be strong enough to carry the load. The pin 24 can be taken out to enable the removal of sleeves 11 and 23 from the portion 9 of the bar 1.

Two depending and diverging fingers 25 and 26 are welded to the support 22 and extend downward in such direction as to hold the tire when it is carried by the support 22 from swinging. It is evident that the fingers 20, 25 and 26 function together to align a wheel with the depending portion 9 of the bar 1. This is important when the wheel is being put on the vehicle.

For some wheels or for tires alone, a more simple support 27 may be substituted for the support 22. This support 27 is a bar with a slightly upturned tip 28 and a sleeve 29. The sleeve 29 is secured on the lower end of the portion 9 in the same manner as the sleeve 23.

Whenever a wheel is to be removed from a vehicle the lifter is placed against the outer side of the wheel. The finger 20 is swung to a horizontal position about the arm 10 to enable the passing of this finger between the tire and an overhanging fender F of the vehicle. The finger 20 will drop down alongside the tire T. The hand crank 17 can then be turned to draw the portion 9 toward the finger 20 until the support 22 is located properly within the rim R of the tire T. In this position the fingers 20, 25 and 26 cooperate to align the wheel with the depending portion 9 of the bar 1. When a hoist is connected to the loop 6 on the sleeve 3 and lifting force is applied the weight of the wheel is taken by the support 22 and the fingers 25 and 26. By shifting the sleeve 3 to left or right on the top portion 2 of the bar 1, the wheel can be held tilted more or less with respect to a vertical plane when it is lifted clear of the vehicle.

Having thus described my invention, I claim:

1. A wheel lifter for a vehicle wheel having a tire mounted on a rim, comprising:
   a main support bar having a generally horizontal top portion and a generally vertical portion depending therefrom for extending downward along side of a wheel;
   means on the top portion for attaching the support bar to a hoist;
   a horizontal extending wheel support affixed to said vertical portion spaced below said horizontal top portion for engaging the wheel rim;

a horizontal extending arm slidably mounted on said vertical portion above the wheel support for extending over the wheel;
a finger mounted on said arm for extending behind the wheel and engaging the backside of the wheel; and
releasable securing means for affixing the extended arm to said vertical portion at a desired spacing from the extending wheel support.

2. The device defined in claim 1 wherein said arm comprises:
a first piece having one end secured on said depending portion;
a second piece slidable lengthwise on said first piece;
said finger being mounted on the end of said second piece most remote from the depending portion; and
means on said pieces operable to slide the second piece along the first piece toward and away from the depending portion.

3. The device defined in claim 1 wherein two fingers are affixed to and diverge downwardly from said support to engage the side of a wheel on said support.

4. The device defined in claim 1 wherein said finger mounted on said extensible arm is turnable about said arm between a horizontal position and a depending position.

5. The device defined in claim 1 wherein said means for attaching the top portion of the bar to a hoist chain comprises a sleeve around the said top portion; and
means to secure said sleeve in any one of several positions along the length of said top portion.

6. The device defined in claim 1 wherein means are provided on said arm for moving the finger toward the depending portion of said bar to hold a wheel on said support.

References Cited

UNITED STATES PATENTS 2,792,139  5/1957  Lloyd _____ 214—147
3,239,072  3/1966  Dunbar _____ 294—82

EVON C. BLUNK, Primary Examiner

D. D. WATTS, Assistant Examiner

U.S. Cl. X.R.

294—82